United States Patent [19]

Saguchi et al.

[11] 4,423,114

[45] Dec. 27, 1983

[54] MAGNETIC POWDER FOR MAGNETIC RECORDING MEDIUM

[75] Inventors: Hiroto Saguchi; Masashi Hayama; Keitaro Sakai, all of Tokyo, Japan

[73] Assignee: TDK Electronics Co., Ltd., Tokyo, Japan

[21] Appl. No.: 300,551

[22] Filed: Sep. 9, 1981

[30] Foreign Application Priority Data

Sep. 11, 1980 [JP] Japan ................. 55-126200

[51] Int. Cl.$^3$ .............................. C01G 49/06
[52] U.S. Cl. ................. 428/403; 252/62.56; 427/127; 428/900; 428/693; 428/694
[58] Field of Search ............ 252/62.56; 428/403, 428/900, 692, 693, 694; 427/127, 128

[56] References Cited

U.S. PATENT DOCUMENTS 4,224,175  9/1980  Montino et al. ............... 252/62.56
4,287,233  9/1981  Rudolf et al. ................ 252/62.56 X
4,302,510  11/1981  Umeki ......................... 428/403

*Primary Examiner*—Jack Cooper
*Attorney, Agent, or Firm*—Oblon, Fisher, Spivak, McClelland & Maier

[57]    ABSTRACT

A magnetic powder for a magnetic recording medium which is a cobalt-adsorbed magnetic iron oxide having a coercive force of 1000 Oe or more and a ratio of a coercive force at −196° C. to a coercive force at room temperature of 3 or less.

1 Claim, 4 Drawing Figures

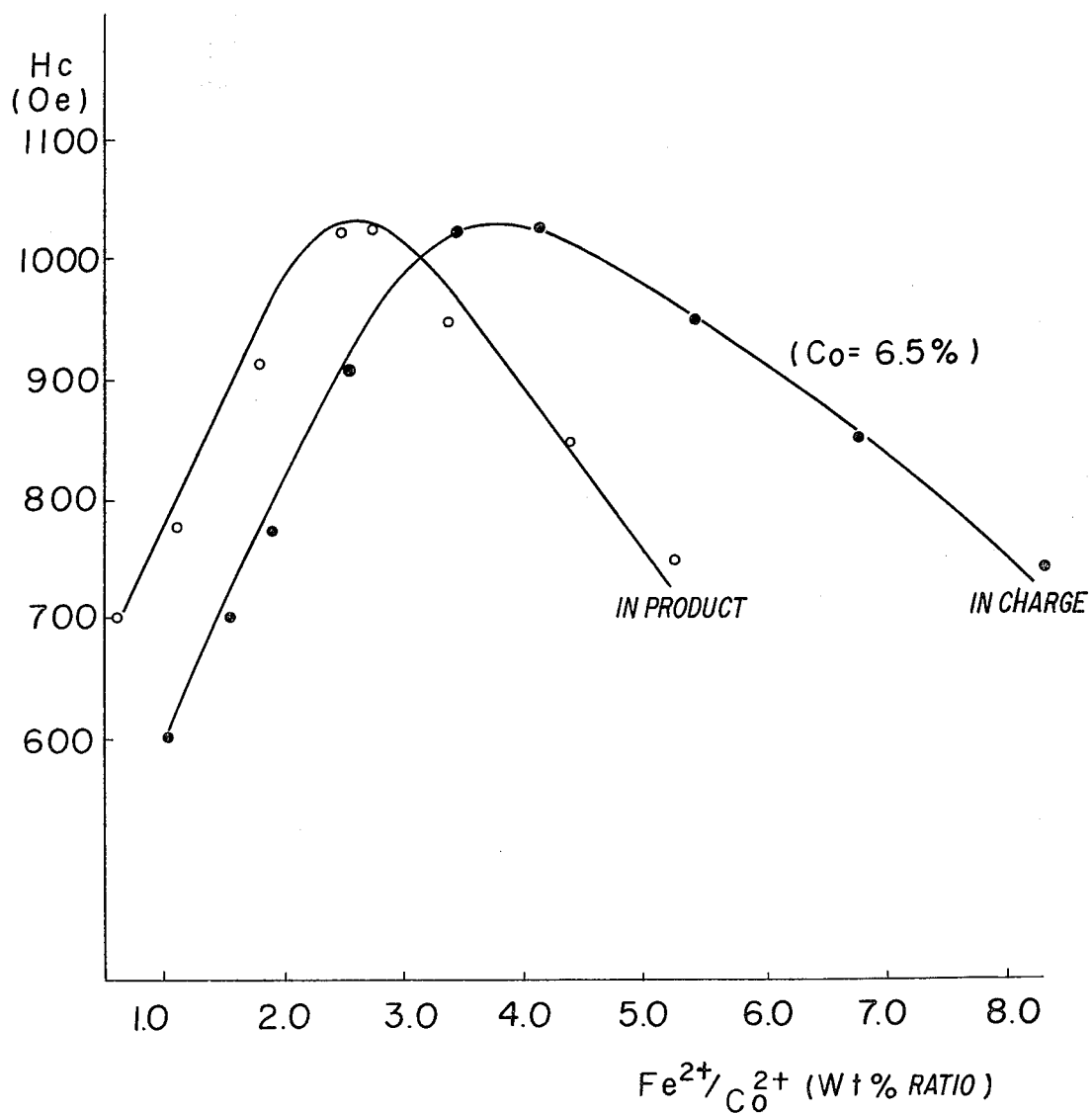

MAGNETIC POWDER FOR MAGNETIC RECORDING MEDIUM

BACKGROUND OF THE INVENTION

1. Field of the Invention

The present invention relates to a magnetic powder for a magnetic recording medium which has high coercive force.

2. Description of the Prior Art

Iron oxide of $\gamma\text{-Fe}_2\text{O}_3$ has been usually used as a magnetic powder for a magnetic recording medium. Recently, a chromium tape has been developed. Thus, cobalt or ferrous ion is adsorbed on chromium dioxide or $\gamma\text{-Fe}_2\text{O}_3$ to impart high coercive force whereby high density recording has been attained. Recently, an alloy type magnetic powder has been developed and the tendency of the development has been further increased.

In general, a cobalt-doped type magnetic powder and a cobalt-adsorbed type magnetic powder have been proposed to give high coercive force. The cobalt-doped type magnetic powder imparts easily high coercive force but is thermally unstable and has inferior printing characteristics. On the other hand, the cobalt-adsorbed type magnetic powder has low coercive force such as up to 1000 Oe.

SUMMARY OF THE INVENTION

It is an object of the present invention to provide a magnetic powder which is thermally stable and has excellent printing characteristics and high coercive force of at least 1000 Oe in a cobalt-adsorbed type.

The foregoing and other objects of the present invention have been attained by providing a magnetic powder for a magnetic recording medium which is a cobalt-adsorbed magnetic iron oxide having a coercive force of 1000 Oe or more and a ratio of a coercive forces at $-196°$ C. to a coercive force at room temperature of 3 or less..

BRIEF DESCRIPTION OF THE DRAWINGS

FIG. 4 is a graph showing a relation of a ratio of $Fe^{2+}/Co^{2+}$ by weight in the product and a ratio of $Fe^{2+}/Co^{2+}$ by weight in the process of the production.

DETAILED DESCRIPTION OF THE PREFERRED EMBODIMENTS

Figure 1:
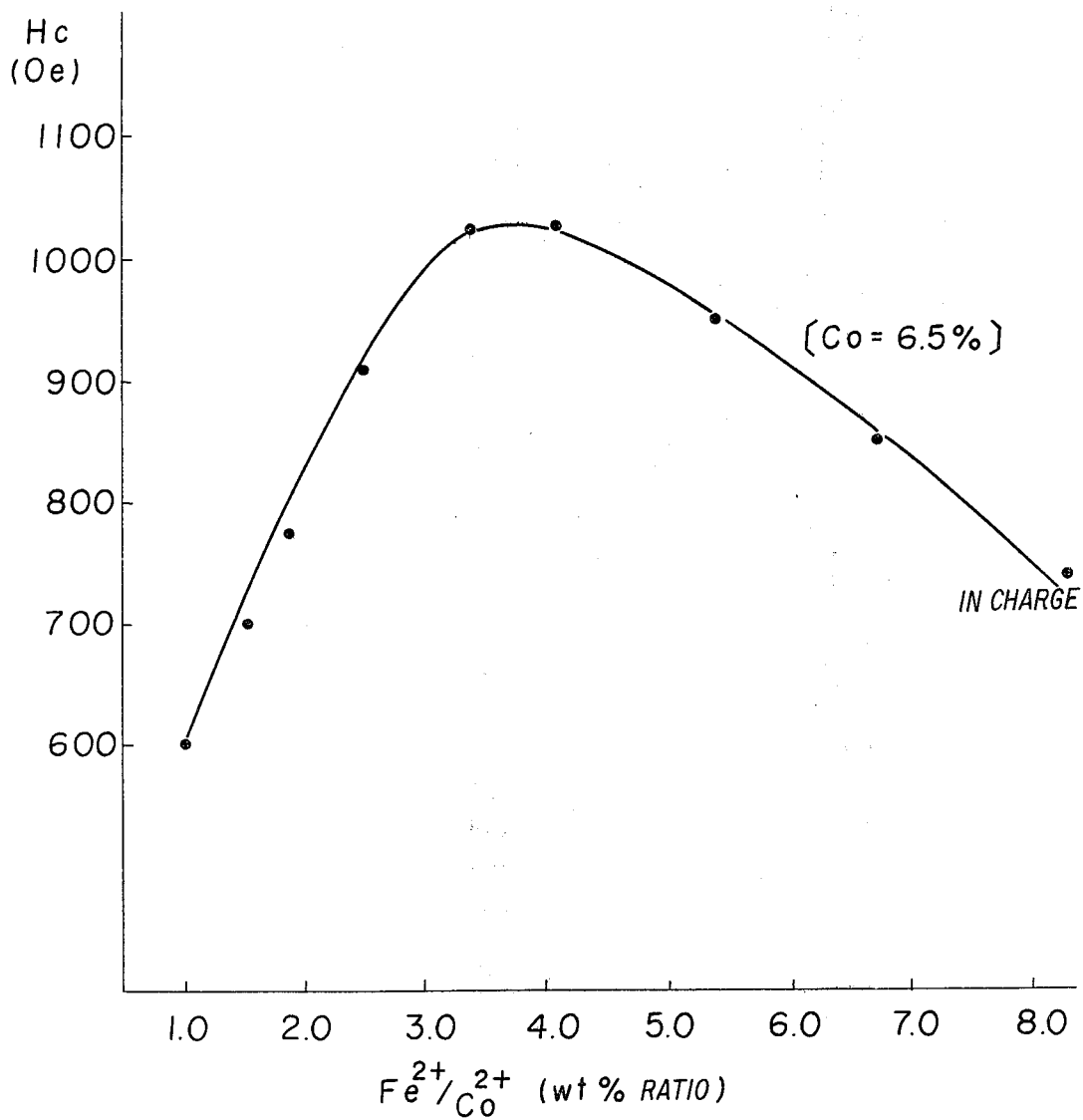
FIG. 1 is a graph showing a relation of a coercive force of the magnetic powder obtained by varying $Fe^{2+}$ at a ratio of $Fe^{2+}/Co^{2+}$ of 1 to 8 in the presence of 6.5 wt.% of a cobalt component in the process of the production.

In Co-adsorbed type magnetic powders, a coercive force increases in proportion to ferrous ion content until reaching a certain level of ferrous ion content; however, a coercive force may decrease over said level of ferrous ion content. In view of this fact, a change of a coercive force is measured under variation of ferrous ions at a constant Co content of 6.5 wt.%. The result is shown in FIG. 1.

That is, $\gamma\text{-Fe}_2\text{O}_3$ is coated with a Co component by adding cobalt ion to $\gamma\text{-Fe}_2\text{O}_3$ at a ratio of 6 wt.% or more and then, adding a ferrous ion at a ratio of 20 wt.% or more as $Fe^{2+}$ based on $\gamma\text{-Fe}_2\text{O}_3$ and at a ratio of $Fe^{2+}/Co^{2+}$ of 3.0 to 4.5 by weight to obtain Co-adsorbed magnetic iron oxide. A ratio of ferrous salt to Co component as $Fe^{2+}/Co^{2+}$ in the product is in a range of 2.0 to 3.5 by weight. The ratio relates to a coercive force. When the ratio of $Fe^{2+}/Co^{2+}$ (the components added to $\gamma\text{-Fe}_2\text{O}_3$) in the process of the production is in the range of 3 to 4.5, a coercive force is as high as at least 1000 Oe.

The relation of the ratio of $Fe^{2+}/Co^{2+}$ by weight in the product and a ratio of $Fe^{2+}/Co^{2+}$ by weight in the process of the production is shown in FIG. 4. The ratio of $Fe^{2+}/Co^{2+}$ by weight in the product is preferably in a range of 2.0 to 3.5 which corresponds to the ratio of the $Fe^{2+}/Co^{2+}$ by weight in the process of the production of 3.0 to 4.5.

The most important factor is a ratio of coercive force at $-196°$ C. to a coercive force at room temperature and this should be 3 or less.

Figure 2:
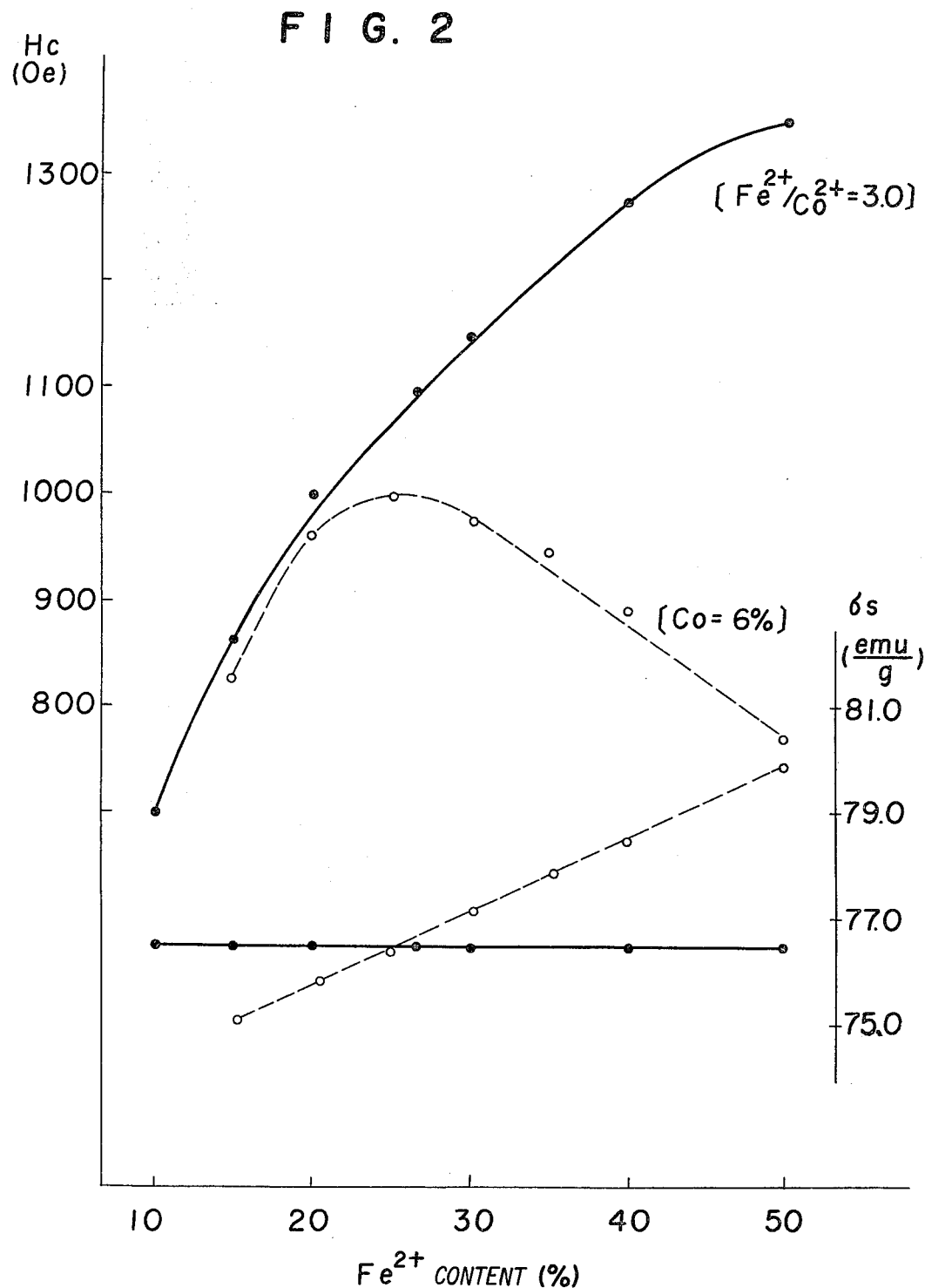
FIG. 2 is a graph showing a relation of an amount of $Fe^{2+}$ to $\gamma\text{-Fe}_2\text{O}_3$ at a ratio of $Fe^{2+}/Co^{2+}$ of 3, a coercive force and a saturated magnetic flux density.

In FIG. 2, the full line shows the relation of the ferrous ion content to the coercive force and the saturated magnetic flux density in the case of the ratio of $Fe^{2+}/Co^{2+}$ of 3 (the components added to $\gamma\text{-Fe}_2\text{O}_3$). As it is clear from the fact, when the ratio of $Fe^{2+}/Co^{2+}$ is constant, the coercive force increases depending upon an increase of contents of the cobalt salt and the ferrous salt. There is no critical point in the addition of the ferrous ion. In this case, the residual magnetic flux density is kept constant.

In FIG. 2, the broken line shows the relation of the ferrous ion content to the coercive force and the saturated magnetic flux density in the case of the cobalt content of 6 wt.%.

When the ferrous ion content is 20 wt.%, the coercive force reaches to 1000 Oe. The coercive force decreases when the ferrous ion content is more or less. That is, there is critical point for the ferrous ion content. The residual magnetic flux density increases depending upon an increase of the ferrous ion content.

When the cobalt content based on $\gamma\text{-Fe}_2\text{O}_3$ is at least 6 wt.% and the ferrous ion content based on $\gamma\text{-Fe}_2\text{O}_3$ is at least 20 wt.%, the coercive force can be at least 1000 Oe.

In view of FIG. 1 and FIG. 2, it is necessary to add at least 6 wt.% of a cobalt component and at least 20 wt.% of ferrous ion based on $\gamma\text{-Fe}_2\text{O}_3$ at a ratio of $Fe^{2+}/Co^{2+}$ of 3 to 4.5.

Figure 3:
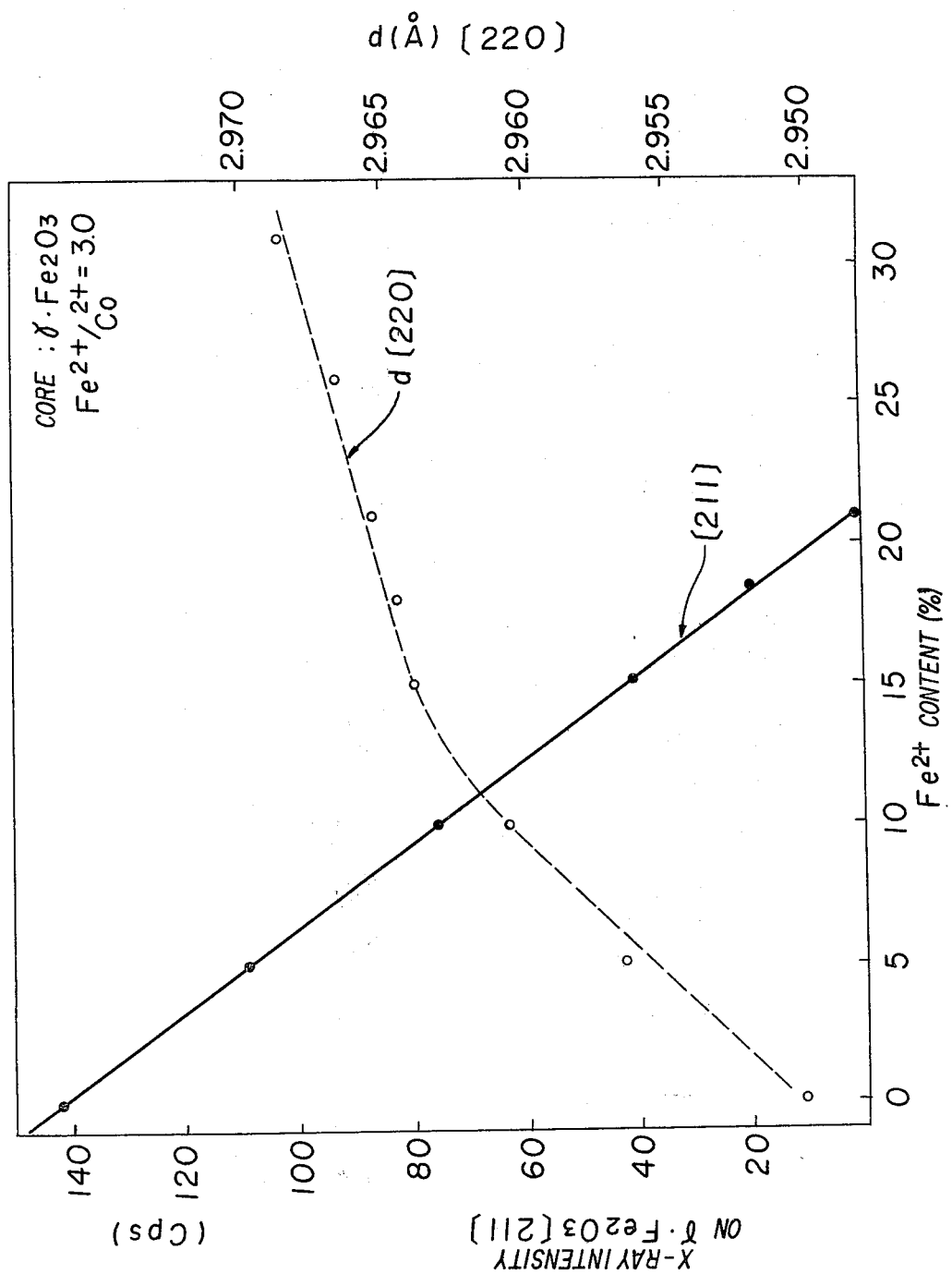
FIG. 3 is a graph showing X ray diffraction of the cobalt-adsorbed magnetic powder.

FIG. 3 shows the result of X-ray diffraction of the Co-adsorbed magnetic powder wherein X-ray intensity on $\gamma\text{-Fe}_2\text{O}_3[211]$ is upto 20 cps; and a spacing (d) on [220] is changed from 2,950 Å to 2,965 Å. When the content of $Fe^{2+}$ is at least 20 wt.%, it is converted into $Fe_2O_4$. This fact is confirmed by the X-ray diffraction.

When the magnetic powder is boiled in 1 N-HCl for 2–3 hours to dissolve the surface thereof and X-ray diffraction, magnetic characteristics, a content of $Fe^{2+}$ and a surface specific area (BET method) of the resulting seeds are tested. As a result, it is confirmed to be $Fe_3O_4$.

The resulting magnetic powder has high coercive force of at least 1000 Oe and can be used for a preparation of an audio cassette tape and a video tape having excellent high frequency characteristics. When the magnetic powder is heat-treated in non-oxidative atmosphere, a magnetic powder having a coercive force of at least 1300 Oe can be obtained. When a cobalt component is adsorbed on the seeds made of $Fe_3O_4$ and the product is heat-treated, a content of $Fe^{2+}$ is not easily controlled. In the cases of the examples, the content of $Fe^{2+}$ is easily controlled to attain a stable coercive force.

Certain examples and references are shown below and the magnetic characteristics of the magnetic powder are shown in Table 1.

The seeds used in the examples and references are as follows: $\gamma\text{-}Fe_2O_3$ having an average diameter of $0.35\mu$; a squareness ratio of 8/1; Hc of 350 Oe; and $\sigma_s$ of 74.0 emu/g. $Fe_3O_4$ having an average diameter of $0.35\mu$; a squareness ratio of 8/1; Hc of 400 Oe and $\sigma_s$ of 80 emu/g.

The present invention will be further illustrated by certain examples and references which are provided for purposes of illustration only and are not intended to be limiting the present invention.

EXAMPLE 1

Into 40 liters of water, 4000 g. of $\gamma\text{-}Fe_2O_3$ was dispersed and 1240 g. of cobalt sulfate ($CoSO_4.7H_2O$) was charged and dissolved and then, a solution of 4700 g. of sodium hydroxide in 10 liters of water was added and a solution of 3976 g. of ferrous sulfate in 20 liters of water was added. The resulting slurry was boiled for 180 minutes and the solid component was washed, filtered and dried to obtain a magnetic powder. In this case, 20 wt.% of $Fe^{2+}$ and 6.5 wt.% of $Co^{2+}$ based on $\gamma\text{-}Fe_2O_3$ were added at a ratio of $Fe^{2+}/Co^{2+}$ of 3.0. The cobalt component in the resulting magnetic powder was 4.5 wt.% as $Co^{2+}$. The magnetic characteristics of the magnetic powder are as follows:

Hc=1000 Oe; $\sigma_s$=76.5 emu/g; $\sigma_r/\sigma_s$=0.52.

EXAMPLE 2

Into 40 liters of water, 4000 g. of $\gamma\text{-}Fe_2O_3$ was dispersed and 1430 g. of cobalt sulfate was charged and dissolved and then, a solution of 5964 g. of ferrous sulfate in 20 liters of water was added. The resulting slurry was boiled for 180 minutes and the solid component was washed, filtered and dried to obtain a magnetic powder. In this case, 30 wt.% of $Fe^{2+}$ and 7.5 wt.% of $Co^{2+}$ based on $\gamma\text{-}Fe_2O_3$ were added at a ratio of $Fe^{2+}/Co^{2+}$ of 4.0. The cobalt component in the resulting magnetic powder was 5.1 wt.% as $Co^{2+}$. The magnetic characteristics of the magnetic powder are as follows:

Hc=1000 Oe; $\sigma_s$=76.5 emu/g; $\sigma_r/\sigma_s$=0.52.

EXAMPLE 3

Into 40 liters of water, 4000 g. of $\gamma\text{-}Fe_2O_3$ was dispersed and 1908 g. of cobalt sulfate was charged and dissolved and then, a solution of 6000 g. of sodium hydroxide in 20 liters of water was added and a solution of 7952 g. of ferrous sulfate in 20 liters of water was added. The resulting slurry was boiled for 3 hours and the solid component was washed, filtered and dried to obtain a magnetic powder. In this case, 40 wt.% of $Fe^{2+}$ and 10 wt.% of $Co^{2+}$ based on $\gamma\text{-}Fe_2O_3$ were added at a ratio of $Fe^{2+}/Co^{2+}$ of 4.0. The cobalt component in the resulting magnetic powder was 5.7 wt.% as $Co^{2+}$. The magnetic characteristics of the magnetic powder are as follows:

Hc=1150 Oe; $\sigma_s$=76.5 emu/g; $\sigma_r/\sigma_s$=0.53.

EXAMPLE 4

Into 40 liters of water, 4000 g. of $\gamma\text{-}Fe_2O_3$ was dispersed and 2290 g. of cobalt sulfate was charged and dissolved and then, a solution of 6000 g. of sodium hydroxide in 20 liters of water was added and a solution of 7157 g. of ferrous sulfate in 20 liters of water was added. The resulting slurry was boiled for 180 minutes and the solid component was washed, filtered and dried to obtain a magnetic powder. In this case, 36 wt.% of $Fe^{2+}$ and 12 wt.% of $Co^{2+}$ based on $\gamma\text{-}Fe_2O_3$ were added at a ratio of $Fe^{2+}/Co^{2+}$ of 3.0. The cobalt component in the resulting magnetic powder was 6.3 wt.% as Co. The magnetic characteristics of the magnetic powder are as follows:

Hc=1225 Oe; $\sigma_s$=76.5 emu/g; $\sigma_r/\sigma_s$=0.52.

REFERENCE 1

The magnetic powder obtained in Example 2 was heat-treated in nitrogen atmosphere at 350° C. for 60 minutes. The magnetic characteristics of the heat-treated magnetic powder are as follows:

Hc=1300 Oe; $\sigma_s$=76.0 emu/g; $\sigma_r/\sigma_s$=0.54.

REFERENCE 2

Into 40 liters of water, 4000 g. of $\gamma\text{-}Fe_2O_3$ was dispersed and 1145 g. of cobalt sulfate was charged and dissolved and a solution of 5300 g. of sodium hydroxide in 20 liters of water was added and a solution of 7157 g. of ferrous sulfate in 20 liters of water was added. The resulting slurry was boiled for 180 minutes and the solid component was washed, filtered and dried to obtain a magnetic powder. In this case, 36 wt.% of $Fe^{2+}$ and 6 wt.% of $Co^{2+}$ based on $\gamma\text{-}Fe_2O_3$ were added at a ratio of $Fe^{2+}/Co^{2+}$ of 6.0. The cobalt component in the resulting magnetic powder was 3.8 wt.% as $Co^{2+}$. The magnetic characteristics of the magnetic powder are as follows:

Hc=950 Oe; $\sigma_s$=78.0 emu/g; $\sigma_r/\sigma_s$=0.51.

REFERENCE 3

Into 40 liters of water, 4000 g. of $\gamma\text{-}Fe_2O_3$ was dispersed and 1145 g. of cobalt sulfate was charged and dissolved and then, a solution of 4400 g. of sodium hydroxide in 20 liters of water was added and a solution of 2982 g. of ferrous sulfate in 10 liters of water was added. The resulting slurry was boiled for 180 minutes and the solid component was washed, filtered and dried to obtain a magnetic powder. In this case, 15 wt.% of $Fe^{2+}$ and 6 wt.% of $Co^{2+}$ based on $\gamma\text{-}Fe_2O_3$ were added at a ratio of $Fe^{2+}/Co^{2+}$ of 2.5. The cobalt component in the magnetic powder was 5.0 wt.% as $Co^{2+}$. The magnetic characteristics of the magnetic powder are as follows:

Hc=825 Oe; $\sigma_s$=75 emu/g; $\sigma_r/\sigma_s$=0.51.

REFERENCE 4

Into 40 liters of water, 4000 g. of $Fe_3O_4$ was dispersed and 764 g. of cobalt sulfate was charged and dissolved and then, a solution of 4400 g. of sodium hydroxide in 20 liters of water added. The resulting slurry was boiled for 180 minutes and the solid component was washed, filtered and dried to obtain a magnetic powder. In this case, 4 wt.% of $Co^{2+}$ based on $Fe_3O_4$ was added. The cobalt component in the magnetic powder was 3.8 wt.% as $Co^{2+}$. The magnetic characteristics of the magnetic powder are as follows:

Hc=600 Oe; $\sigma_s$=76 emu/g; $\sigma_r/\sigma_s$=0.50.

REFERENCE 5

The magnetic powder obtained in Reference 4 was heat-treated in nitrogen atmosphere at 300° C. for 60 minutes. The cobalt component in magnetic powder was 3.8 wt.% as $Co^{2+}$. The magnetic characteristics of the heat-treated magnetic powder are as follows:

Hc = 1300 Oe; $\sigma_s$ = 76 emu/g; $\sigma_r/\sigma_s$ = 0.53.

REFERENCE 6

Into 40 liters of water, 4000 g. of $\gamma$-$Fe_2O_3$ was dispersed and 572 g. of cobalt sulfate was charged and dissolved and a solution of 4400 g. of sodium hydroxide in 10 liters was added and a solution of 994 g. of ferrous sulfate in 10 liters of water was added. The resulting slurry was boiled for 180 minutes and the solid component was washed, filtered and dried to obtain a magnetic powder. The cobalt component in the resulting magnetic powder was 2.8 wt.% as Co. The magnetic characteristics of the magnetic powder are as follows:

Hc = 550 Oe; $\sigma_s$ = emu/g; $\sigma_r/\sigma_s$ = 0.5.

REFERENCE 7

The magnetic powder obtained in Reference 6 was heat-treated in nitrogen atmosphere at 400° C. The magnetic characteristics of the resulting magnetic powder are as follows:

Hc = 1000 Oe; $\sigma_s$ = 73 emu/g; $\sigma_r/\sigma_s$ = 0.53.

TABLE 1

|  | Exp. 1 | Exp. 2 | Exp. 3 | Exp. 4 | Ref. 1 |
| --- | --- | --- | --- | --- | --- |
| Type: |  |  |  |  |  |
| Co-adsorbed | O | O | O | O | — |
| Co-doped | — | — | — | — | O |
| Heat treatment | none | none | none | none | O |
| Formulation (wt. %): |  |  |  |  |  |
| Seed $\gamma$-$Fe_2O_3$ | O | O | O | O | O |
| Seed $Fe_3O_4$ | — | — | — | — | — |
| Co content | 6.5 | 7.5 | 10.0 | 12.0 | 7.5 |
| Fe content | 20.0 | 30.0 | 40.0 | 36.0 | 30.0 |
| ratio of $Fe^{2+}/Co^{2+}$ | 3.0/1 | 4.0/1 | 4.0/1 | 3.0/1 | 4.0/1 |
| Magnetic characteristic: |  |  |  |  |  |
| Hc | 1000 | 1100 | 1150 | 1225 | 1300 |
| $\sigma_s$ | 76.5 | 76.5 | 76.5 | 76.5 | 76.0 |
| $\sigma_r/\sigma_s$ | 0.52 | 0.52 | 0.53 | 0.52 | 0.54 |
| Temp. characteristic-196° C./room temp.: |  |  |  |  |  |
| ratio of Hc | 2.2 | 2.2 | 2.4 | 2.3 | 3.4 |
| ratio of $\sigma_r$ | 1.34 | 1.34 | 1.34 | 1.35 | 1.61 |
| ratio of $\sigma_s$ | 1.03 | 1.03 | 1.04 | 1.02 | 0.89 |
| Product ratio of $Fe^{2+}/Co^{2+}$ | 2.4 | 2.7 | 2.8 | 2.2 |  |

O shows the correspondency

TABLE 1'

|  | Ref. 2 | Ref. 3 | Ref. 4 | Ref. 5 | Ref. 6 | Ref. 7 |
| --- | --- | --- | --- | --- | --- | --- |
| Type: |  |  |  |  |  |  |
| Co-adsorbed | O | O | O | — | O | — |
| Co-doped | — | — | — | O | — | O |
| Heat Treatment | none | none | none | O | none | O |
| Formulation (wt. %): |  |  |  |  |  |  |
| Seed $\gamma$-$Fe_2O_3$ | O | O | — | — | O | O |
| Seed $Fe_3O_4$ | — | — | O | O | — | — |
| Co content | 6.0 | 6.0 | 4.0 | 4.0 | 3.0 | 3.0 |
| Fe content | 36.0 | 15.0 | 0 | 0 | 5.0 | 5.0 |
| ratio of $Fe^{2+}/Co^{2+}$ | 6.0/1 | 2.5/1 |  |  | 1.7/1 | 1.7/1 |
| Magnetic characteristic: |  |  |  |  |  |  |
| Hc | 950 | 825 | 600 | 1300 | 550 | 1000 |
| $\sigma_s$ | 78.0 | 75.0 | 76.0 | 76.0 | 74.0 | 73.0 |
| $\sigma_r/\sigma_s$ | 0.51 | 0.51 | 0.50 | 0.53 | 0.50 | 0.53 |
| Temp. characteristic-196° C./room temp.: |  |  |  |  |  |  |
| ratio of Hc | 2.4 | 2.0 | 1.6 | 3.1 | 2.3 | 4.3 |
| ratio of $\sigma_r$ | 1.35 | 1.30 | 1.2 | 1.81 | 1.4 | 1.5 |
| ratio of $\sigma_s$ | 1.03 | 1.00 | 1.06 | 0.98 | 1.06 | 0.93 |

O shows the correspondency

We claim:

1. A magnetic powder for a magnetic recording medium which is a cobalt-adsorbed magnetic iron oxide comprising $\gamma$-$Fe_2O_3$, having a coercive force of at least 1000 Oe and a ratio of a coercive force at $-196°$ C. to a coercive force at room temperature of 3 or less, which magnetic powder is obtained by coating said $\gamma$-$Fe_2O_3$ in dispersion with a cobalt component by adding cobalt ion to $\gamma$-$Fe_2O_3$ at a ratio of 6 wt. % or more, and then adding ferrous ion at a ratio of 20 wt. % or more as $Fe^{2+}$ based on $\gamma$-$Fe_2O_3$ and at a ratio of said ferrous salt to said cobalt salt of 3.0 to 4.5 by weight so as to adsorb $Fe^{2+}$ and $Co^{2+}$ in a $Fe^{2+}/Co^{2+}$ weight ratio of 2.0 to 3.5.

* * * * *